United States Patent [19]

Poppinger et al.

[11] 4,145,650

[45] Mar. 20, 1979

[54] METHOD AND APPARATUS FOR OPERATING AN INTERNALLY TIMED SWITCHING REGULATOR

[75] Inventors: Herbert Poppinger; Gautam Tendulkar, both of Erlangen, Fed. Rep. of Germany

[73] Assignee: Siemens Aktiengesellschaft, Munich, Fed. Rep. of Germany

[21] Appl. No.: 813,285

[22] Filed: Jul. 6, 1977

[30] Foreign Application Priority Data

Jul. 28, 1976 [DE] Fed. Rep. of Germany ....... 2633923

[51] Int. Cl.$^2$ .............................................. G05F 1/56
[52] U.S. Cl. .................................. 323/17; 323/DIG. 1
[58] Field of Search .......................... 323/17, DIG. 1; 307/297

[56] References Cited

U.S. PATENT DOCUMENTS

| 3,320,512 | 5/1967 | Kruger | 323/DIG. 1 |
| 3,670,233 | 6/1972 | Zellmer et al. | 323/17 |

OTHER PUBLICATIONS

*Solid/State/Design,* Apr. 1963; pp. 30-34; "Considerations in the Design of Switching Type Regulators" by Loucks.
*Electronic Design* 6, Mar. 15, 1975; pp. 54-58; article by E. R. Hnatek.

*Primary Examiner*—Gerald Goldberg
*Attorney, Agent, or Firm*—Kenyon & Kenyon, Reilly, Carr & Chapin

[57] ABSTRACT

A method and apparatus for operating an internally timed switching regulator, in which a controllable switch is closed when the output voltage falls below a predetermined first set value and in which the controllable switch is opened when the output voltage exceeds a second set value in which an exponentially variable second set value is used in order to obtain at least approximately constant "on" or "off" time of the switch, to thereby keep the switching frequency constant regardless of changes of the input voltage, the load and the ambient temperature.

11 Claims, 8 Drawing Figures

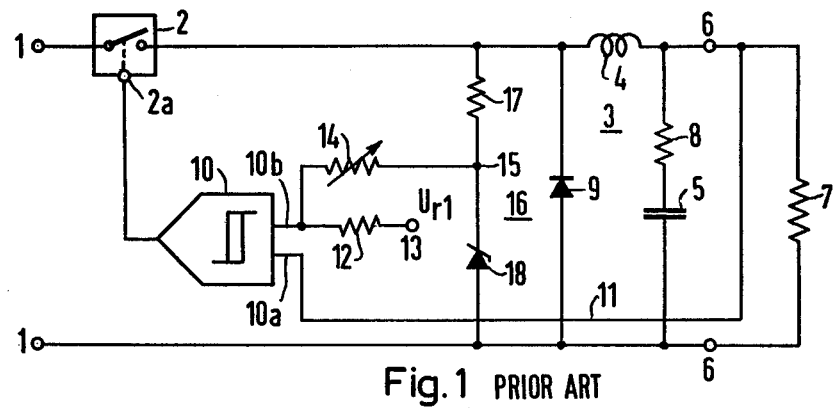
Fig. 1 PRIOR ART
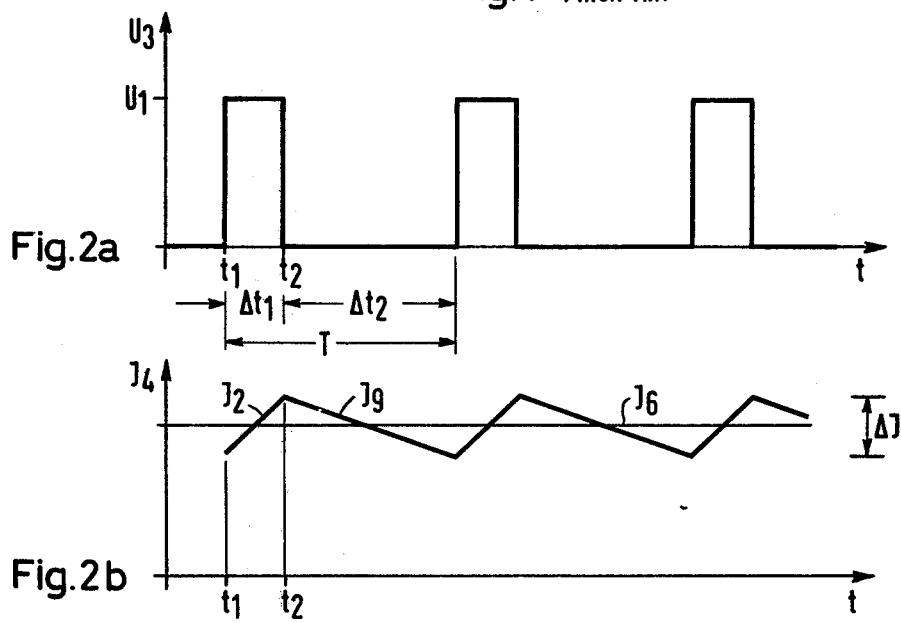
Fig. 2a
Fig. 2b
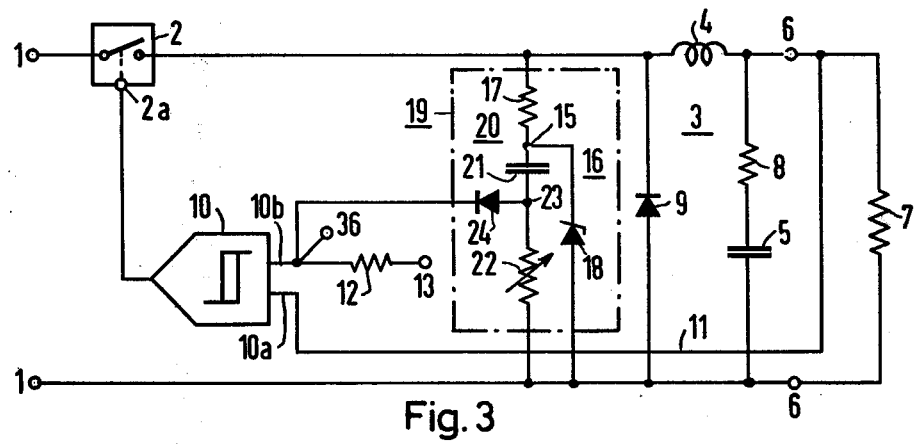
Fig. 3

METHOD AND APPARATUS FOR OPERATING AN INTERNALLY TIMED SWITCHING REGULATOR

BACKGROUND OF THE INVENTION

This invention relates to internally timed switching regulators in general and more particularly to an improved method and apparatus for operating such a regulator.

The invention is particularly directed to a method of operating such a regulator in which a controllable switch is closed when the output voltage falls below a predetermined first set value and in which the controllable switch is opened when the output voltage exceeds a second set value and to an internally timed switching regulator for implementing this method comprising two input terminals and two output terminals, a controlled switch and a choke coupling the input terminals to the output terminals, with a capacitor shunted across the output terminals and a bypass diode shunting the L-C circuit comprising the capacitor and choke, and a limit indicator. The output of the limit indicator is connected to a control input of the switch and has an actual value input the voltage present at the output terminals and, as a reference value input, a line connected to a terminal and to the junction point of a series circuit consisting of a first resistor and a first Zener diode shunted across the bypass diode.

The basic method and an internally timed switching regulator of this nature are described in "Siemens-Zeitschrift" 48, (1974), Supplement "Integrated Building Block Systems SIMATIC", pages 76 to 79. They are used particularly in power supplies, e.g., in integrated circuit power supplies. In these internally timed switching regulators, the switch, which is in general a control transistor, is either completely conducting or completely open. The pulsating d-c voltage at the output of the switch is smoothed again by an L-C member following the switch. Through the choice of the first and second set value, periodic operation of the switch is obtained, the duty cycle being responsible for the magnitude of the constant d-c voltage which is present at the output terminals. The two set values are generally given by two settable limits of a limit indicator, the hysteresis of which thereby determine the switching frequency of the internally timed switching regulator. In the known method, however, the switching frequency remains dependent on various other parameters, for instance, the input voltage, the ambient temperature and the load. It is therefore scarcely possible to keep the switching frequency of a switching regulator operating in accordance with the known method constant, which is important, for instance, if the switching frequency is to remain outside the audible range, i.e., above 20 kHz, in order to eliminate acoustical interference.

The problem thus arises to develop a method of the type mentioned at the outset and apparatus for implementing this method in such a manner that the switching frequency remains at least approximately constant.

SUMMARY OF THE INVENTION

According to the present invention, this problem is solved by feeding a function exponentially varying in time as the second reference value. With an exponentially decaying second reference value, a constant "on" time is obtained and with an exponentially rising second reference value a constant "off" time is obtained.

With the method according to the present invention, a switching frequency at least independent of the ambient temperature is obtained for constant "on" time or a switching frequency independent of the ambient temperature as well as largely independent of the input voltage and the load for constant "off" time. Thereby, a constant frequency corresponding to the specified requirements can be realized, with which acoustical interference can also be eliminated. It should be noted that this constant frequency is achieved with only a few additional passive components, whereby only little cost accrues. Using the method according to the present invention, synchronization of the switching frequency of parallel connected switching regulators can also be carried out without beat frequencies being generated as is done in known switching regulators. Thereby, the advantages of an externally timed switching regulator is obtained in addition to those of an internally timed regulator.

In one advantageous apparatus for implementing the method acording to the present invention, the reference value input of the limit indicator is connected to the tap of an R-C member which is shunted across the first Zener diode. With this embodiment, constant "on" time and therefore, independence of the switching frequency from the ambient temperature can be realized.

In a second advantageous embodiment, a second series circuit consisting of a second resistor and a second Zener diode is shunted across the bypass diode, the second resistor of the second series circuit being shunted by an R-C member, to the tap of which the reference input of the limit indicator is connected. A diode can be shunted across the resistor of the R-C member. In this embodiment, the "off" time depends only on the input voltage. With increased input voltage, the "off" time increases and one thereby obtains independence of the switching frequency from the ambient temperature as well as essential independence from the input voltage and the load. For stabilizing the hysteresis of the limit indicator in this embodiment, the second resistor in the second series circuit consisting of the second resistor and the second Zener diode can have a tap to which, on the one hand, the R-C member and, on the other hand, a further, third Zener diode are connected, the further, third Zener diode being shunted across a partial resistor and the second Zener diode of the second series circuit. The "off" time is then also independent of the input voltage. Thus, however, the switching frequency is dependent on the input voltage. If the ratio of the input voltage to the output voltage is large, however, this dependence is negligibly small.

BRIEF DESCRIPTION OF THE DRAWINGS

FIG. 1 is a schematic diagram of a prior art internally timed switching regulator.

FIGS. 2a and 2b are waveform diagrams illustrating the operation of the circuit of FIG. 1.

FIG. 3 is a schematic diagram of a switching regulator according to the present invention.

DETAILED DESCRIPTION OF THE INVENTION

Figure 4:
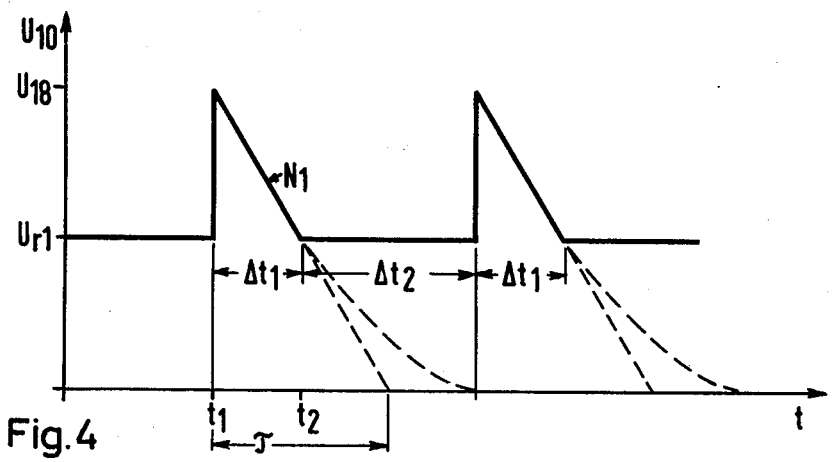
FIG. 4 is a waveform diagram illustrating the operation of the circuit of FIG. 3.

To illustrate the problems which are the basis of the present invention, FIG. 1 shows the schematic circuit diagram of an internally timed switching regulator which is known, for instance, from the above-mentioned literature reference as a power supply for integrated circuits. Input terminals 1, to which the input d-c voltage $U_1$ is applied, are connected to a controllable switch 2 which may be, for instance, a transistor. The switch 2 is followed by an L-C member 3 consisting of a series circuit of a choke 4 and a capacitor 5 acting as a smoothing filter or lowpass filter. The output terminals 6, to which the load 7 is connected, are coupled to the electrodes of the capacitor 5. As an equivalent circuit, the equivalent series loss resistance of the capacitor 5 is shown as a resistor 8 connected in series with the latter. In general, electrolytic capacitors are used in switching regulators and the capacitor 5 of the L-C member 3 will be such. The series loss resistor 8 is then the equivalent resistance of the electrolytic capacitor, also called the equivalent series resistance (ESR). The L-C member 3 is shunted by a bypass diode 9.

For driving the switch 2, its control input 2a, e.g., the base of a transistor, is connected to the output of a limit indicator or control amplifier 10 with two point behavior. The output voltage $U_6$ present at the terminals 6 is fed to the actual value input 10a of the limit indicator 10 via the line 11. The reference value 10b is connected via a resistor 12 to a terminal 13, to which a reference voltage $U_{r1}$ is applied as the first set value. In addition, the reference value input 10b of the limit indicator 10 is connected via a variable resistor 14 to the junction point 15 of a series circuit 16, which consists of a resistor 17 and a Zener diode 18, which are shunted across the bypass diode 9. With the resistor 14 and the series circuit 16, a second set value $U_{r2}$ which is larger than $U_{r1}$ is established. At the output of the limit indicator 10, a signal is present, by which the switch 2 is closed when the actual value falls below the reference value $U_{r1}$. This signal disappears and the switch 2 is opened when the second set value $U_{r2}$, obtained from the series circuit 16, is exceeded.

The operation of the switching regulator according to FIG. 1 will be explained with reference to FIGS. 2a and 2b, in which the voltage $U_3$ present at the input of the L-C member 3 and the current $I_4$ flowing in the choke 4 are plotted versus the time t. The limit indicator 10 of the circuit according to FIG. 1 compares the output voltage $U_6$ with the reference voltage $U_{r1}$. If $U_6$ becomes smaller than $U_{r1}$, then the switch 2 is closed at the time $t_1$ by the output signal of the limit indicator 10. During the "on" time $\Delta t_1$, a current $I_2$ now flows via the switch 2 into the storage choke 4 until at the time $t_2$ the output voltage $U_6$ has risen to the upper set voltage given by the resistor 14, or the upper tripping point $U_{r2}$, and the switch 2 is opened at the time $t_2$ via the output signal of the limit indicator 10. During the subsequent "off" time $\Delta t_2$, the energy stored in the choke 4 continues to drive the current $I_9$ through the load 7, the capacitor 5 and the bypass diode 9 until the output voltage $U_6$ reaches the lower return tripping point given by the reference voltage $U_{r1}$ again and the switching cycle begins over again.

For the hysteresis $\Delta U$ determined by the tripping point and the return tripping point, we have $$\Delta U = (U_{18} - U_{r1}) \cdot \frac{R_{12}}{R_{12} + R_{14}} \qquad (1)$$

and the current $I_4$ in the choke 4 is given by:

$$I_4 = I_2 + I_9 \qquad (2)$$

where $U_{18}$ is the voltage dropping across the Zener diode 18 and $R_{12}$ and $R_{14}$, the resistances of the resistors 12 and 14 respectively.

A triangular a-c current flows via the capacitor 5: $\Delta I = I_4 - I_6$, where $I_6$ is the smoothed current which flows via the output terminals 6 and which corresponds to the mean value of $I_2$ and $I_9$. Because of the series loss resistance 8, one obtains, with the current $\Delta I$ flowing via the capacitor 5, a corresponding triangular voltage drop which is equal to the hysteresis $\Delta U$, at least if the capacity of the capacitor 5 is large enough:

$$\Delta U = \Delta I \cdot R_8 = (I_4 - I_6) \cdot R_8 \qquad (3)$$

$$\text{and } U_6 = U_6 + \Delta U \qquad (4)$$

where $R_8$ is the resistance of the resistor 8 and $U_6$ the mean value of the output voltage. The hysteresis $\Delta U$ thus appears as the ripple of the output voltage $U_6$.

During the "on" time $\Delta t_1$, one obtains as the slope of the current in the choke relation:

$$\frac{dI}{dt} = \frac{\Delta I}{\Delta t_1} = \frac{U_1 - U_6}{L_4} \qquad (5)$$

wherefrom the "on" time $\Delta t_1$ and the ripple or hysteresis $\Delta U$ results:

$$\Delta t_1 = \frac{L_4}{U_1 - U_6} \cdot \frac{\Delta U}{R_8} \qquad (6)$$

and $$\Delta U = \frac{U_1 - U_6}{L_4} \cdot \Delta t_1 \cdot R_8 \qquad (7)$$

where $L_4$ is the inductance of the choke 4. The decrease of the current in the choke 4 during the "off" time $\Delta t_2$ is given by:

$$-\frac{dI}{dt} = -\frac{\Delta I}{\Delta t_2} = -\frac{U_6}{L_4} \qquad (8)$$

wherefrom, with Equation (3), the following relations are obtained for $\Delta t_2$ and $\Delta U$:

$$\Delta t_2 = \frac{L_4}{U_6} \cdot \frac{\Delta U}{R_8} \qquad (9)$$

and $$\Delta U = \frac{U_6}{L_4} \cdot t_2 \cdot R_8 \qquad (10)$$

From this, the switching frequency F can be calculated from $$F = 1/T \text{ with } T = \Delta t_1 + \Delta t_2 \qquad (11)$$

and one obtains:

$$F = \frac{R_8}{\Delta U \cdot L_4} \cdot \frac{U_6(U_1 - U_6)}{U_1} \tag{12}$$

It can be seen from this relation that in internally controlled switching regulators according to FIG. 1 with predetermined, constant hysteresis $\Delta U$, the switching frequency F depends on the series loss resistance 8 and the input voltage $U_1$, the switching frequency F being proportional to the resistance $R_8$ of the resistor 8. For higher input voltages, the "on" time $\Delta t_1$ is shorter, while the "off" time $\Delta t_2$ remains constant. The frequency change resulting therefrom is small, however, as the "on" time in general is substantially shorter than the "off" time. Thus, with an input voltage $U_1$ of 24 V and an output voltage $U_6$ of about 5 V, for instance, the ratio $\Delta t_1/\Delta t_2$ is approximately 1:4. The switching frequency can also change with the inductance of the choke 4. The inductance of the storage choke 4 can change by 10% for a current which is about 0.1 times the nominal current. According to the relations above, the switching frequency will thus also decrease proportionally.

In the switching regulator shown in FIG. 1, the switching frequency at which the switch 2 is driven, is therefore dependent on the input voltage $U_1$ as well as on the resistance $R_8$ of the series loss resistor 8 and thus, on the ambient temperature. This can lead particularly to acoustic interference, as was already explained.

An embodiment of a switching regulator according to the present invention, in which the influence of the series loss resistor 8 is compensated, is shown in FIG. 3. The switching regulator according to FIG. 3 differs from the switching regulator according to FIG. 1 by the compensating arrangement 19. In the compensating arrangement 19, the Zener diode 18 of the series circuit 16 is shunted by an R-C member 20 consisting of a capacitor 21 and a resistor 22, which in the illustrated embodiment is variable, and the tap 23 of which is connected via a decoupling diode 24 to the reference input 10b of the limit indicator 10.

The operation of a switching regulator according to FIG. 3 will be explained in conjunction with FIG. 4, in which the voltage $U_{10}$ appearing at the reference value input 10b of the limit indicator 10 is plotted versus the time t. With the R-C member 20, one obtains an exponentially decaying hysteresis. Under the assumption that the input resistance of the limit indicator 10 goes toward infinity, one obtains for the voltage $U_{10}$ at the reference value input 10b of the limit indicator 10 the relation $$U_{10} = U_{18} \cdot e^{-\frac{t}{\tau}} \tag{13}$$

with $$\tau = R_{22} \cdot C_{21},$$

where $R_{22}$ is the resistance of the resistor 22 and $C_{21}$ the capacity of the capacitor 21. In first approximation, $U_{10}$ has a linear waveform during the "on" time $\Delta t_1$ and its slope $N_1$ is:

$$N_1 = \frac{U_{18} - U_{r1}}{\Delta t_1} \approx \frac{U_{18}}{\tau} \tag{14}$$

The slope $N_2$ of the output voltage $U_6$ during the "on" time $\Delta t_1$, because of Equation (7), is given by $$N_2 = \frac{\Delta U}{\Delta t_1} = \frac{U_1 - U_6}{L_4} \cdot R_8, \tag{15}$$

where $N_1$ is large as compared to $N_2$. With an input voltage $U_1 = 24$ V, and output voltage $U_6$ of 5 V, a reference voltage $U_{r1}$ of 5 V, an inductance of the choke 4 of 100 μH, a resistance of the series resistor 8 of 50 mohm and a switching frequency F of 20 kHz, for instance, one gets $N_1 = -1$ V/μs and $N_2 = 0.0095$ V/μs. With this, the reference value voltage $U_{10}$ and the actual value voltage $U_{11}$ can be expressed in first approximation by:

$$U_{10} = N_1 \cdot t + U_{18} - U_{r1} \tag{16}$$

$$U_{11} = N_2 t, \text{ where } t_1 \text{ is chosen as zero time.} \tag{17}$$

At the upper tripping point of the limit indicator 10, we have $U_{10} = U_{11}$ with the result:

$$\Delta t_1 = \frac{U_{18} - U_{r1}}{N_2 - N_1} \tag{18}$$

$$\approx -\frac{U_{18} - U_{r1}}{N_1}, \text{ as } N_1 \gg N_2 \tag{19}$$

The "on" time $\Delta t_1$ is thus constant in first approximation and independent of the slope of the output voltage as well as of the actual value voltage. With Equations (7) and (9) one obtains for T:

$$T = \Delta t_1 \cdot \frac{U_1}{U_6} \tag{20}$$

and as a result, for the switching frequency:

$$F = \frac{U_6}{\Delta t_1 \cdot U_1} \tag{21}$$

Thus, the switching frequency F is only still inversely proportional to the input voltage $U_1$, as $\Delta t_1$ and $U_6$ are constant. Dependence on the resistance $R_8$ of the series loss resistor 8 and thus, dependence on the ambient temperature no longer exists. However, with increasing load, a voltage drop can also occur in the switch 2, which causes an additional change of the switching frequency F.

Figure 7:
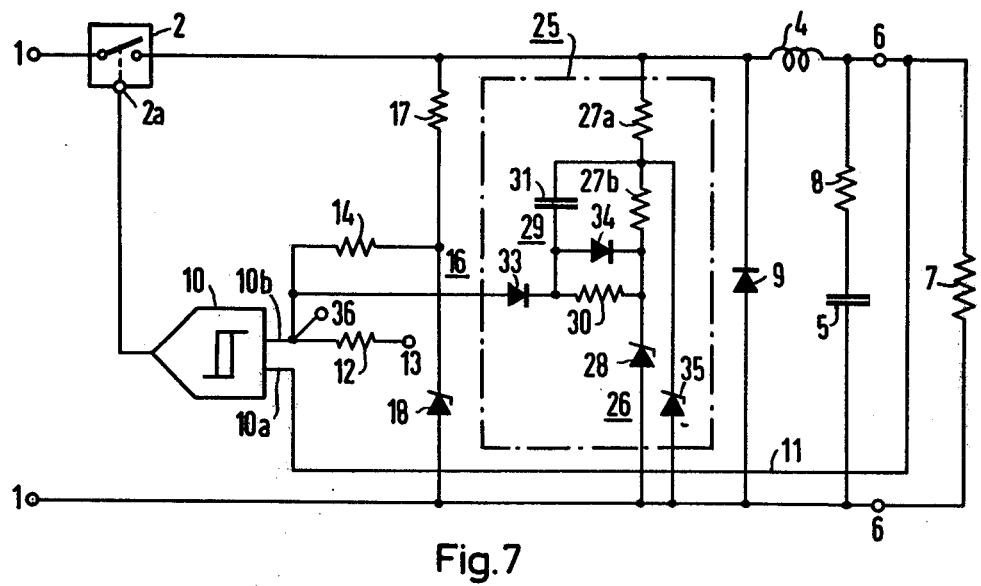
FIG. 7 is a schematic diagram of an embodiment of the present invention which is a modification of FIG. 5.

FIG. 7 illustrates an embodiment of the switching regulator of the present invention in which the "off" time is constant, and the switching frequency therefore becomes independent of the series loss resistance 8 and also substantially independent of the input voltage $U_1$ and the load 7. The embodiment according to FIG. 7 differs from the switching regulators according to FIGS. 1 and 3 by the compensating circuit 25. The compensating circuit 25 contains a second series circuit 26 consisting of a resistor 27 and a Zener diode 28, this second series circuit again being shunted across the bypass diode 9. The resistor 27 comprises two partial resistors 27a and 27b in series with a tap therebetween. The resistor 27b is shunted by an R-C member 29, comprising capacitor 31 and a resistor 30. The series circuit comprising the resistor 27b and Zener diode 28 is shunted by a further zener diode 35. The tap 32 of the R-C member 29 is connected via a decoupling diode 33 to the reference value input 10b of the limit indicator 10.

So that the capacitor 31 can discharge fast when switching on, a diode 34 is shunted across the resistor 30.

Upon switching off at the time $t_2$, the R-C member 29 generates an exponentially rising reference value voltage or hysteresis, which is fed via the diode 33 to the reference value input 10b of the limit indicator 10. The peak value of this hysteresis voltage is stabilized by the Zener diode 35. This exponentially increasing hysteresis cooperates with the hysteresis generated by the resistor 14, whereby a constant "off" time $\Delta t_2$ is obtained, independent of the resistance of the series loss resistor 8, the input voltage $U_1$ and the load. Since however, the "on" time $\Delta t_1$ changes as a function of the input voltage $U_1$, the switching frequency F depends on the input voltage $U_1$. Since the "on" time $\Delta t_1$ is small compared to the "off" time $\Delta t_2$ if the ratio $U_1/U_6$ is large, this dependence is negligibly small for a large ratio of $U_1/U_6$.

Figure 6:
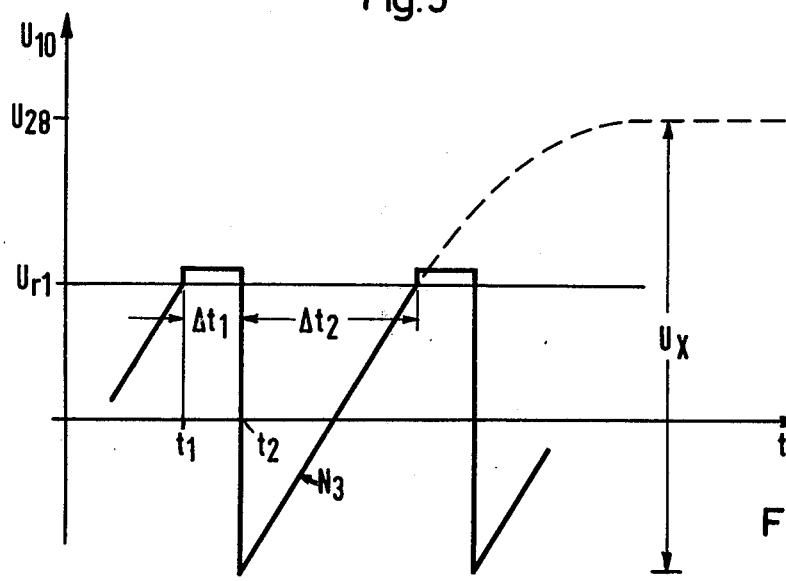
FIG. 6 is a waveform diagram illustrating operation of the circuit of FIG. 7.

The operation of the switching regulator according to FIG. 7 will be explained in conjunction with FIG. 6, in which the reference value voltage $U_{10}$ present at the input 10b of the limit indicator 10, is plotted versus the time t. The constant "off" time $\Delta t_2$ and the switching frequency F are calculated similarly as in connection with FIG. 3. It follows from the exponentially rising hysteresis during the off time $\Delta t_2$ that $U_{10}$ increases linearly with a slope $$N_3 = U_H/\Delta t_2 = \frac{U_x - U_{28} + U_{r1}}{\Delta t_2} \quad (22)$$

Where $U_H$ is the hysteresis voltage, $U_{28}$ the Zener voltage of the Zener diode 28, $U_x$ the Zener voltage of the Zener diode 35, and $U_{r1}$ the first reference voltage applied to the terminal 13. Because of equation (10), the slope of the output voltage $U_6$ and, therefore, the actual value voltage $U_{11}$, during the "off" time, $\Delta t_2$ is as follows:

$$N_4 = -\frac{\Delta U}{\Delta t_2} = -\frac{U_6 \cdot R_8}{L_4} \quad (23)$$

where $|N_3| >> |N_4|$. For an input voltage of 24 V, an output voltage of 5 V, a reference voltage $U_{r1}$ of 5 V, a voltage $U_{28}$ at the Zener diode 28 of 10 V, a resistance $R_8$ of 50 mohm and a switching frequency of 20 kHz, for instance, one obtains the slope $N_3 = 0.325$ V/µs and the slope $N_4 = 0.0025$ V/µs. During the "off" time $\Delta t_2$ for $U_{10}$ and $U_{11}$ one obtains therewith:

$$U_{10} = N_3 \cdot t - U_H + U_{r1} \quad (24)$$

$$U_{11} = N_4 \cdot t + U_{r1} \quad (25)$$

and at the intersection of $U_{10}$ and $U_{11}$, which represents the return tripping point or the lower reference value, it follows from $U_{10} = U_{11}$:

$$\Delta t_2 = \frac{U_H}{N_3 - N_4} \simeq \frac{U_H}{N_3} \text{ because of } |N_3| >> |N_4| \quad (26)$$

Thus, $\Delta t_2$ is constant if $N_3$ is constant. From this, the switching frequency F can be calculated, using Equations (6) and (10), and one obtains $$F = \frac{1}{\Delta t_2} \cdot \frac{U_1 - U_6}{U_1} \quad (27)$$

Figure 5:
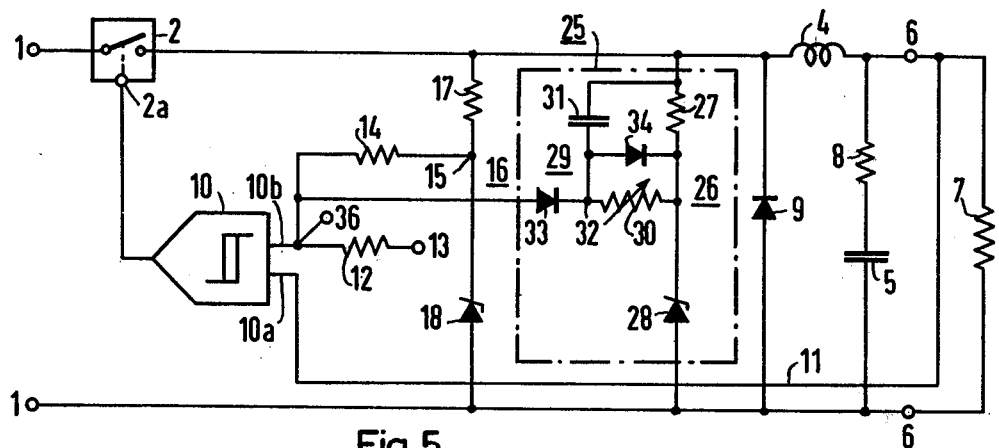
FIG. 5 is a schematic diagram of a further embodiment of the present invention.

Thus, the switching frequency F is also independent of the series loss resistor 8 in the embodiment according to FIG. 5. However, it remains dependent on the input voltage $U_1$, but this dependence is slight and can generally be neglected, since for $U_1 > U_6$, the expression $(U_1 - U_6)/U_1$ is approximately constant. For $U_1 >> U_6$, the dependence disappears practically entirely, since the fraction given above becomes approximately 1.

A modification of the embodiment according to FIG. 7 is shown in FIG. 5. In this embodiment, the compensating circuit 25 is designed without a Zener diode 35. The hysteresis voltage $U_H$ is therefore not constant but increases with the input voltage $U_1$. Thereby, the "off" time $\Delta t_2$ is also increased at higher increased voltages $U_1$ and the frequency dependence still existing in the embodiment of FIG. 7 is further reduced.

It should further be mentioned that the switching regulators according to the present invention as per FIGS. 3, 5 and 7 can be connected parallel via the terminals 36 and synchronize each other. Thus, the switching regulator according to the present invention combines the advantages of an externally timed switching regulator with those of an internally timed one.

We claim:

1. A method for operating an internally timed switching regulator, in which a controllable switch is switched "on" when the output voltage falls below a predetermined first set value and in which the controllable switch is switched "off" when the output voltage exceeds a second set value, comprising feeding said controllable switch with an exponentially variable second set value.

2. The method according to claim 1, wherein said second set value is established to be exponentially decaying in order to obtain a constant "on" time.

3. The method according to claim 1, wherein said second set value is established to be exponentially rising in order to obtain a constant "off" time.

4. In an internally timed switching regulator comprising: a pair of input terminals; a pair of output terminals; a controllable switch and a choke in series coupling said input terminals to said output terminals; a capacitor shunted across said output terminals; a bypass diode shunting the L-C member comprising said capacitor and choke; a limit indicator having its output coupled to the control input of said switch and having an actual voltage input obtained from said output terminals and a reference value input; a terminal coupled to said reference value input; and a first resistor and a first Zener diode in series shunted across said bypass diode, the junction of said first resistor and first Zener diode coupled to said reference value input, the inprovement comprising a series R-C member comprising a capacitor and resistor in series coupled across said first Zener diode, the junction point of said capacitor and resistor coupled to said reference value input of said limit indicator.

5. The improvement according to claim 4 and further including a decoupling diode coupling the reference value input of the limit indicator to said junction point.

6. The improvement according to claim 4 wherein the resistor of said R-C member is variable.

7. In an internally timed switching regulator comprising: a pair of input terminals; a pair of output terminals; a controllable switch and a choke in series coupling said input terminals to said output terminals; a capacitor shunted across said output terminals; a bypass diode shunting the L-C member comprising said capacitor and choke; a limit indicator having its output coupled to the control input of said switch and having an actual voltage input obtained from said output terminals and a reference value input; a terminal coupled to said reference value input; and a first resistor and a first Zener diode in series shunted across said bypass diode, the junction of said first resistor and first Zener diode coupled to said reference value input, the improvement comprising a second series circuit comprising a second resistor and second Zener diode shunted across said bypass diode; and R-C member comprising a capacitor and resistor in series shunted across the second resistor in said second series circuit, the junction point of said resistor and capacitor of said R-C member coupled to the reference input of said limit indicator.

8. The improvement according to claim 7 and further including a decoupling diode coupling the reference value input to said junction point of the R-C member.

9. The improvement according to claim 7 and further including a diode shunting the resistor of said R-C member.

10. The improvement according to claim 7 wherein the resistor of the R-C member is variable.

11. The improvement according to claim 7 wherein, in said second series circuit including a second resistor and a second Zener diode, said second resistor has a tap and wherein said R-C member and a further, third Zener diode are connected to said tap, said third Zener diode connected so as to be shunted across a part of said resistor and the second Zener diode of the second series circuit.

* * * * *